United States Patent [19]

Mahn et al.

[11] 4,104,033
[45] Aug. 1, 1978

[54] FOAM PREVENTION IN SODIUM CARBONATE CRYSTALLIZATION

[75] Inventors: Frederick Mahn, Verona; Kenneth Breindel, Landing; Clyde Scanley, Morristown; David Sexsmith, Kinnelon, all of N.J.

[73] Assignee: Drew Chemical Corporation, Boonton, N.J.

[21] Appl. No.: 688,271

[22] Filed: May 20, 1976

Related U.S. Application Data

[63] Continuation-in-part of Ser. No. 612,641, Sep. 12, 1975, abandoned.

[51] Int. Cl.² .............................. B01d 9/02; C01d 7/24
[52] U.S. Cl. .................................... 23/300; 23/302 T; 423/206 T; 252/321
[58] Field of Search .............. 23/300, 302 T; 423/206, 423/206 T; 252/321

[56] References Cited

U.S. PATENT DOCUMENTS

| | | | |
|---|---|---|---|
| 2,670,269 | 2/1954 | Rahn | 23/302 T X |
| 2,914,412 | 11/1959 | Stephan | 252/321 X |
| 3,084,026 | 4/1963 | Frint et al. | 23/302 T X |
| 3,628,919 | 12/1971 | Beauchamp | 23/302 T X |
| 3,725,014 | 4/1973 | Poncha et al. | 23/302 T X |
| 3,796,794 | 3/1974 | Ilardi | 23/302 T X |
| 3,836,628 | 9/1974 | Ilardi et al. | 23/302 T X |
| 3,846,329 | 11/1974 | Householder et al. | 252/321X |
| 3,890,238 | 6/1975 | Boehmer | 252/321 X |
| 3,962,119 | 6/1976 | Cosentino et al. | 252/321 X |

OTHER PUBLICATIONS

*Polyethers*, Part I, Polyalkylene Oxides and Other Polyethers, Gaylord, N.G., ed., Interscience Publishers, N.Y. (1963), pp. 207–210, 233–237.
*Organic Chemistry*, Morrison & Boyd (1965) pp. 521–522.

*Primary Examiner*—Stephen J. Emery
*Attorney, Agent, or Firm*—Marn & Jangarathis

[57] ABSTRACT

In crystallization of a carbonate of sodium from aqueous solutions, a water soluble homopolymer of oxyethylene or block copolymer of oxyethylene and oxypropylene is employed as a defoamer. The presence of the defoamer in the resulting sodium carbonate does not adversely interfere with carbon dioxide absorption in subsequent production of sodium bicarbonate.

16 Claims, No Drawings

FOAM PREVENTION IN SODIUM CARBONATE CRYSTALLIZATION

This application is a continuation-in-part of U.S. application Ser. No. 612,641, filed on Sep. 12, 1975 now abandoned.

This invention relates to the crystallization of a carbonate of sodium from an aqueous solution thereof and more particularly, to the prevention of foaming during such crystallization.

The recovery of sodium carbonate from trona ore (comprised essentially of sodium sesquicarbonate) generally involves calcination of the ore to produce sodium carbonate, followed by dissolution in water and separation of insoluble matter. The aqueous solution of sodium carbonate is then subjected to evaporative crystallization in order to recover the sodium carbonate. As a result of organic impurities present in the solution, there is severe foaming during such crystallization which causes operating difficulties and, accordingly, there is a need to prevent foaming during such crystallization.

An object of the invention is to provide a process for crystallizing a carbonate of sodium from aqueous solution.

Another object of the invention is to prevent foaming in a process for crystallizing a carbonate of sodium from an aqueous solution.

These and other objects of the invention should be apparent from the following description thereof.

In accordance with the present invention, there is provided a process for crystallizing a carbonate of sodium from an aqueous solution thereof wherein the crystallization is effected in the presence of an effective foam preventing amount of at least one water soluble oxyalkylene polymer which is a homopolymer of oxyethylene or a block copolymer of oxyethylene and oxypropylene having an oxyethylene content and molecular weight to provide for effective defoaming.

In employing an oxyethylene homopolymer, the molecular weight is generally at least about 200 and in general does not exceed about 1,000,000. In most cases, the molecular weight does not exceed about 100,000. The homopolymer is preferably employed in the form of a glycol.

The block copolymers of oxyethylene and oxypropylene which are used in the present invention may be either the so-called regular block copolymers wherein the end block units are oxyethylene, with the intermediate unit being either an oxypropylene block or blocks of oxypropylene and oxyethylene, or the so-called reverse block copolymers wherein the end block units are oxypropylene, with the intermediate unit being either an oxyethylene block or blocks of oxyethylene and oxypropylene. The block copolymers contain at least 10%, by weight, of polyoxyethylene, based on the two components.

In employing the regular block copolymer, for those block copolymers having from 10 to 50%, by weight, polyoxyethylene, based on the two components, the polymer has a molecular weight of at least 200 and no greater than from about 1000 to about 4500, with the lower maximum molecular weights corresponding to the lower polyoxyethylene contents; i.e., as the polyoxyethylene content increases, the higher maximum molecular weights within the range can be employed; for those block copolymers having from about 50 to about 75%, by weight, polyoxyethylene, based on the two components, the polymer has a molecular weight of at least about 200 and no greater than about 4500 to about 13,000, with the lower maximum molecular weights corresponding to the lower oxyethylene contents; and for those having a polyoxyethylene content of at least 75%, by weight, based on the two components, the molecular weight is at least about 200 and no greater than about 13,000 to about 1,000,000 (most generally no greater than about 100,000), with the lower maximum molecular weights corresponding to the lower polyoxyethylene contents.

In employing the reverse block copolymer, for those having a polyoxyethylene content of from about 10 to about 40%, by weight, based on the two components, the molecular weight is at least 200 and no greater than about 2400 to about 4000, with the lower maximum molecular weights corresponding to the lower oxyethylene contents; and for those having a polyoxyethylene content of above about 40%, by weight, based on the two components, the molecular weight is at least about 200 and no greater than about 4000 to about 1,000,000. (generally no greater than about 100,000), with the lower maximum molecular weights corresponding to the lower oxyethylene contents.

The selection of an oxyethylene content and molecular weight best suited for a particular purpose is within the skill of the art from the teachings herein.

The defoamer of the present invention, which is a water soluble homopolymer of oxyethylene or a water soluble block copolymer of oxyethylene and oxypropylene, may be employed in the form of a glycol or in a form wherein one or both of the terminal hydrogen atoms has been replaced with an organic residue which does not render the polymer water insoluble; in particular, the residue of: a hydrocarbon alcohol having 1-5 carbon atoms; a hydrocarbon carboxylic acid having 1-5 carbon atoms (an alkanoic or alkenoic acid); a hydrocarbon amine having 1-5 carbon atoms; or a hydrocarbon amide having 1-5 carbon atoms. The preferred defoamer is polyethylene glycol and the preferred block copolymers are also in the glycol form.

The oxyalkylene polymer defoamer of the present invention is added to the aqueous solution containing a carbonate of sodium in an amount effective to prevent foaming. In general, the oxyalkylene polymer is added in an amount of from about 1 ppm to about 250 ppm and preferably in an amount from about 1 ppm to about 75 ppm, all based on sodium carbonate. It is to be understood, however, that the above amounts are illustrative of those generally employed, and in some cases, it may be possible to prevent foaming by the use of lower amounts. Similarly, higher amounts could be employed, however, the use of such higher amounts is not economical.

The process of the present invention is generally applicable to the crystallization of a carbonate of sodium from an aqueous solution thereof. The term carbonate of sodium includes, sodium carbonate and/or bicarbonate, in solution and includes, as resulting crystals, depending on the starting solution, and conditions, sodium bicarbonate, sodium carbonate, sodium sesquicarbonate, anhydrous sodium carbonate, and sodium carbonate monohydrate.

The crystallization of carbonate of sodium from an aqueous carbonate of sodium solution in the presence of a foam preventing amount of the oxyalkylene polymer is generally effected with aqueous solutions containing at least 5%, by weight, equivalent sodium carbonate, and most generally at least about 20%, by weight, equivalent sodium carbonate. The crystallization can be effected with aqueous solutions containing carbonate of sodium up to the saturation level, with such crystallization, for economic reasons, generally being effected with essentially saturated solutions. The crystallization of a carbonate of sodium from an aqueous carbonate of sodium solution is generally effected at temperatures from about 20° to about 115° C, and preferably at temperatures from about 25° to about 109° C.

Although the present invention is generally effective for preventing foaming in the crystallization of a carbonate of sodium from an aqueous carbonate of sodium solution, the process is particularly applicable to a process for recovering carbonate of sodium from an ore, preferably trona ore, although the process is also applicable to the recovery of carbonate of sodium from other ores, such as nahcolite, thermonatrite, natron and the like.

In the trona process, an aqueous solution of sodium carbonate, generally prepared by calcination of the trona ore, dissolution in water and separation of insoluble material, contains foam causing impurities which are mainly attributable to the kerogenaceous material associated with the natural carbonate occuring minerals. The carbonate solution generally includes such impurities in amounts of from about 10 to 1000 ppm organic carbon, calculated on a sodium carbonate basis.

The sodium carbonate is then crystallized from the aqueous solution thereof in the presence of a foam preventing amount of the hereinabove described oxyalkylene polymer, preferably polyethyleneglycol. The crystallization is generally effected by evaporative crystallization in multiple effect evaporative crystallizers. The details of the evaporative crystallization form no part of the present invention and, accordingly, no further description thereof is deemed necessary for a complete understanding of the present invention. Further details with respect to crystallization of carbonate of sodium may be found in U.S. Pat. No. 3,725,014 and the patents described therein, all of which are hereby incorporated by reference.

The results achieved with the present invention are completely unexpected in that the oxyalkylene polymers which are employed to prevent foaming during the crystallization of carbonate of sodium, as a result of the water solubility thereof, have not been considered suitable as defoamers; i.e., known defoamers for aqueous systems are insoluble in water.

In addition, the defoamers employed in the present invention offer the further unexpected advantage that such defoamers do not act as defoamers in the subsequent processing of sodium carbonate to produce sodium bicarbonate. More particularly, the sodium carbonate crystals which are recovered from the aqueous solution generally include some of the defoamer present during the crystallization. One of the primary uses of sodium carbonate is as a starting material for the production of sodium bicarbonate by reaction of an aqueous solution of sodium carbonate with carbon dioxide. In such a process, carbon dioxide is bubbled through the aqueous solution, and the defoaming properties of the defoamer would have an adverse effect on the ability of the solution to absorb carbon dioxide as a result of the production of larger and fewer bubbles which decrease the gas-liquid interface. It has been found that the oxyalkylene polymer defoamers of the present invention act as effective defoamers to prevent foam during the crystallization of sodium carbonate; however, in subsequent carbon dioxide addition to aqueous sodium carbonate solutions, the oxyalkylene polymer defoamers of the present invention do not act as defoamers and, accordingly, do not adversely interfere with carbon dioxide absorption.

The invention will be further described with respect to the following examples; however, the scope of the invention is not to be limited thereby.

EXAMPLES

Test Solution

The test solution employed in the following examples is produced by adding calcined trona ore (sodium carbonate and rock) to tap water to produce a 30% sodium carbonate solution. The solution is agitated for 15 minutes and allowed to settle for 20 minutes. The decanted liquid is filtered and the filtrate has an alkalinity of 28–30%.

Foam Test I

In this method foam was generated by passing air, containing water vapor, through coarse glass frit submerged in 300 milliliters of the carbonate test solution maintained at 45° ± 5° C in a 500-milliliter graduated cylinder at a constant air flow rate of about 1075 cubic centimeters per minute, metered at 14.7 psia at 21° C. The foam generated above the liquor is immediately titrated with a methanol solution comprising 100 ppm of the defoaming agent dissolved in pure methyl alcohol. The methanol solution is added in successively decreasing increments and the endpoint is defined as the volume of titrant beyond which additional increments do not appreciably further decrease the foam of the process solution. The Foam Index represents the number of milliliters of this standard solution, required to eliminate the foam of 300 milliliters of process solution at 45° ± 5° C when sparged with air containing water vapor flowing at a rate of 1,075 cubic centimeters per minute metered at 14.7 psia at 21° C.

Foam Test II

In this method, 100 milliliters of clarified-filtered carbonate process solution, not treated, is placed in a 250 milliliter gas washing bottle with a coarse glass frit. Small increments, usually about 0.1 milliliters, of the anti-foaming agent is added generally as an aqueous solution at a concentration of about 0.05% weight. The mixture is maintained at a temperature of 45° ± 5° C and sparged with air, containing water vapor, at a constant air flow rate and the concentration of defoamer found to essentially prevent a foam height of less than about 1-centimeter height was recorded as the minimum concentration of anti-foamer required, basis contained equivalent sodium carbonate in the solution. The results of the various anti-foamers tested were reported as parts per million (ppm), basis contained equivalent sodium carbonate. Without the addition of the anti-foaming agent, sparging humidified air through a carbonate process solution would yield a foam volume of infinite height and therefore could not be directly measurable by this second test method.

Carbon Dioxide Absorption

The test solution is refluxed for 2.5 hours with the defoamer and carbonated after dilution by bubbling carbon dioxide (460 cc/min) through the solution to produce sodium bicarbonate. Bicarbonate titer of a 20ml sample is then determined and termed the "absorption value." An absorption value of 8 to 10 units is acceptable with 10 to 14 being preferred. In the absence of any defoamer, 13.7 units are obtained.

| Defoamer | Test I | Test II | CO$_2$ Absorption Conc. ppm Na$_2$CO$_3$ basis | Value |
|---|---|---|---|---|
| Polyethylene Glycol MW 4000 | 18 | 25 | 20 | 11.9 |
| | | | 60 | 11.1 |
| 50% Aqueous solution of Polyethylene Glycol (MW) 4000 | 23 | 50 | 20 | 14.1 |
| | | | 40 | 11.9 |
| | | | 60 | 11.6 |

The following copolymers (50% aqueous solutions) were also subjected to defoaming tests I and II and to the carbon dioxide absorption test, and found to be acceptable:

| Regular Glycol Block Copolymers (Oxyethylene End Groups) | | |
|---|---|---|
| Oxyethylene | Oxypropylene | Molecular Weight |
| 20 | 80 | 1600 |
| 40 | 60 | 2200 |
| 50 | 50 | 1800 |
| 50 | 50 | 3400 |
| 80 | 20 | 5000 |

| Reverse Glycol Block Copolymers (Oxypropylene End Groups) | | |
|---|---|---|
| Oxyethylene | Oxypropylene | Molecular Weight |
| 10 | 90 | 2000 |
| 20 | 80 | 3400 |
| 50 | 50 | 2000 |
| 80 | 20 | 5000 |

The use of polyethylene glycol as a defoamer has been found to be particularly effective in that the polyethylene glycol provides effective defoaming during the processing of sodium carbonate, and does not adversely interfere with carbon dioxide absorption to produce sodium bicarbonate. In addition, polyethylene glycol has FDA approval and, accordingly, is suitable for production of sodium bicarbonate for food applications.

Numerous modifications and variations of the present invention are possible in light of the above teachings and, therefore, within the scope of the appended claims, the invention may be practiced otherwise than as particularly described.

What is claimed is:

1. In a process for crystallizing a carbonate of sodium from an aqueous solution containing a carbonate of sodium, the improvement comprising:
effecting said crystallization in the presence of a foam preventing amount of a defoamer consisting essentially of at least one water soluble oxyalkylene polymer, said oxyalkylene polymer being selected from the group consisting of oxyethylene homopolymers have a molecular weight of at least 200 and no greater than about 1,000,000; regular block copolymers of oxyethylene and oxypropylene wherein the molecular weight is at least 200 and no greater than from about 1,000 to about 4,500 when the oxyethylene content is from about 10 to about 50%, by weight, the molecular weight being at least 200 and no greater than about 4,500 to about 13,000 when the oxyethylene content is from about 50% to about 75%, and the molecular weight being at least 200 and no greater than from about 13,000 to about 1,000,000 when the oxyethylene content is at least 75%, by weight; and reverse oxyethylene-oxypropylene block copolymers wherein the molecular weight is at least 200 and no greater than about 2,400 to about 4,000 when the oxyethylene content is from about 10% to about 40%, by weight, with the molecular weight being at least about 200 and no greater than about 4,000 to about 1,000,000 when the oxyethylene content is above about 40%, by weight, said oxyalkylene polymer being in a form selected from the group consisting of glycols and glycols in which at least one of the terminal hydrogen atoms is substituted with a residue selected from the group consisting of a hydrocarbon alcohol having 1–5 carbon atoms, a hydrocarbon carboxylic acid having 1–5 carbon atoms, and a hydrocarbon amide having 1–5 carbon atoms.

2. The process of claim 1 wherein the crystallization is effected at a temperature from about 20° to about 115° C.

3. The process of claim 2 wherein the aqueous solution contains at least 5%, by weight, equivalent sodium carbonate.

4. The process of claim 3 wherein the oxyalkylene polymer is added in an amount from about 1 ppm to about 250 ppm, based on sodium carbonate.

5. The process of claim 1 wherein the oxyalkylene polymer is a regular block copolymer of oxypropylene and oxyethylene.

6. The process of claim 5 wherein the block copolymer is in the glycol form.

7. The process of claim 1 wherein the oxyalkylene polymer is a reverse block copolymer of oxyethylene and oxypropylene.

8. The process of claim 7 wherein the block copolymer is in glycol form.

9. The process of claim 1 wherein the oxyalkylene polymer is a homopolymer of oxyethylene.

10. The process of claim 1 wherein the oxyalkylene polymer is polyoxyethylene glycol.

11. The process of claim 10 wherein the crystallization is effected at a temperature from about 20° to about 115° C and the aqueous solution contains at least 5%, by weight, equivalent sodium carbonate.

12. The process 10 wherein the polyoxyethylene glycol is added in an amount from about 1 ppm to about 250ppm based on sodium carbonate.

13. In a process for recovering sodium carbonate from trona ore wherein the ore is dissolved in water followed by separation of insoluble material to provide an aqueous solution of sodium carbonate, followed by crystallization of the sodium carbonate from the aqueous solution, the improvement comprising:
affecting said crystallization in the presence of a foam preventing amount of polyoxyethylene glycol, said polyoxyethylene glycol having a molecular weight of at least about 200 and no greater than about 1,000,000.

14. The process of claim 13 wherein the polyoxyethylene glycol has a molecular weight of no greater than about 100,000.

15. The process of claim 13 wherein the crystallization is effected at a temperature from about 20° to about 115° C.

16. In a process for crystallizing a carbonate of sodium from an aqueous solution containing a carbonate of sodium, and subsequent carbonation of an aqueous solution of crystallized sodium carbonate with carbon dioxde to produce sodium bicarbonate, comprising:

effecting said crystallization in the presence of a foam preventing amount of a defoamer consisting essentially of at least one water soluble oxyalkylene polymer, said oxyalkylene polymer being selected from the group consisting of oxyethylene homopolymers having a molecular weight of at least 200 and no greater than about 1,000,000; regular block copolymers of oxyethylene and oxypropylene wherein the molecular weight is at least 200 and no greater than from about 1,000 to about 4,500 when the oxyethylene content is from about 10 to about 50%, by weight, the molecular weight being at least 200 and no greater than about 4,500 to about 13,000 when the oxyethylene content is from about 50% to about 75%, and the molecular weight being at least 200 and no greater than from about 13,000 to about 1,000,000 when the oxyethylene content is at least 75%, by weight; and reverse oxyethylene-oxypropylene block copolymers wherein the molecular weight is at least 200 and no greater than about 2,400 to about 4,000 when the oxyethylene content is from about 10 to about 40%, by weight, with the molecular weight being at least about 200 and no greater than about 4,000 to about 1,000,000 when the oxyethylene content is above about 40%, by weight, whereby said oxyethylene polymer functions as a defoamer during said crystallization and retained oxyalkylene polymer does not act as a defoamer in the subsequent carbonation.

* * * * *